(12) United States Patent
Sandoval

(10) Patent No.: US 7,835,962 B1
(45) Date of Patent: *Nov. 16, 2010

(54) METHODS AND SYSTEMS FOR PROVIDING AN INVESTMENT INSTRUMENT WITH PERIODIC PRINCIPAL PAYMENTS

(75) Inventor: Christopher Andrew Sandoval, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 11/548,205

(22) Filed: Oct. 10, 2006

(51) Int. Cl.
*G06Q 40/00* (2006.01)
(52) U.S. Cl. .......................... 705/35; 705/30
(58) Field of Classification Search ............. 705/10–44
See application file for complete search history.

(56) References Cited

U.S. PATENT DOCUMENTS

| | | | | |
|---|---|---|---|---|
| 4,751,640 A | * | 6/1988 | Lucas et al. | 705/36 R |
| 5,335,277 A | * | 8/1994 | Harvey et al. | 380/242 |
| 5,644,727 A | * | 7/1997 | Atkins | 705/40 |
| 5,742,775 A | * | 4/1998 | King | 705/38 |
| 6,064,969 A | | 5/2000 | Haskins | |
| 2006/0074804 A1 | | 4/2006 | Cinar | |
| 2007/0043666 A1 | | 2/2007 | Burdette | |
| 2007/0239582 A1 | | 10/2007 | Tyson | |

OTHER PUBLICATIONS

"Certificate of deposit", http://en.wikipedia.org/wiki/Certificate_of_deposit, Oct. 3, 2006, pp. 1-5.
"Money Market: Certificate of Deposit (CD)", http://www.investopedia.com/university/moneymarket/moneymarket3.asp, Oct. 5, 2006, pp. 1-2.
"Certificate of Deposit—CD", http://www.investopedia.com/terms/c/certificateofdeposit.asp, Oct. 5, 2006, pp. 1-2.

* cited by examiner

*Primary Examiner*—Frantzy Poinvil
(74) *Attorney, Agent, or Firm*—Brooks, Cameron & Huebsch, PLLC

(57) ABSTRACT

A method of providing an investment instrument with periodic principal payments. The method includes calculating an interest amount using a current holding amount and a current interest rate; adding the interest amount to the current holding amount to form a new holding amount; determining if the new holding amount is at least at an agreed-upon level; decreasing the current interest rate if it is determined that the new holding amount is not at least at the agreed-upon level; receiving a deposit from a customer; and adding the received deposit to the new holding amount to yield a new current holding amount. The customer is under a contractual agreement to make a series of periodic deposits over a term of the investment instrument.

21 Claims, 3 Drawing Sheets

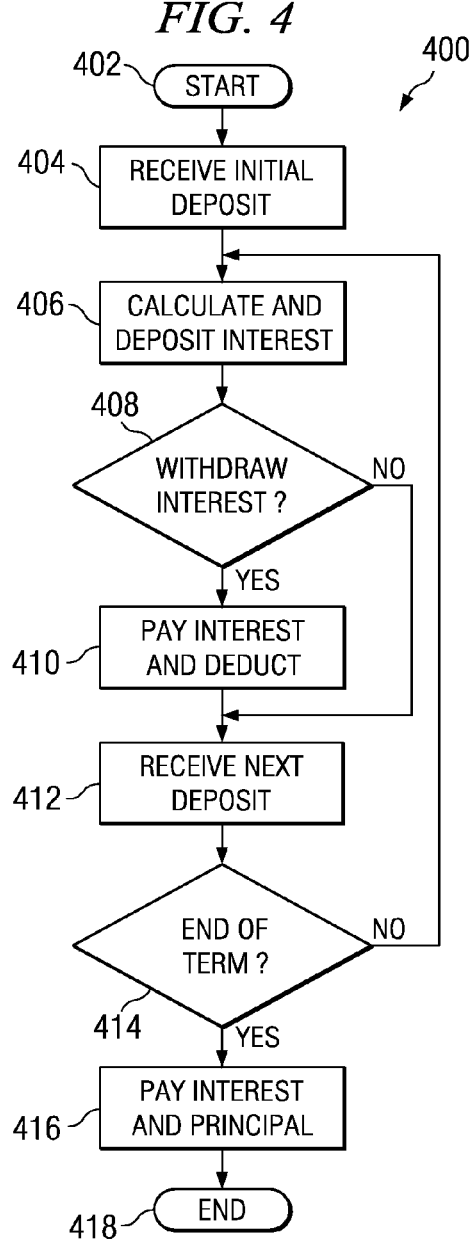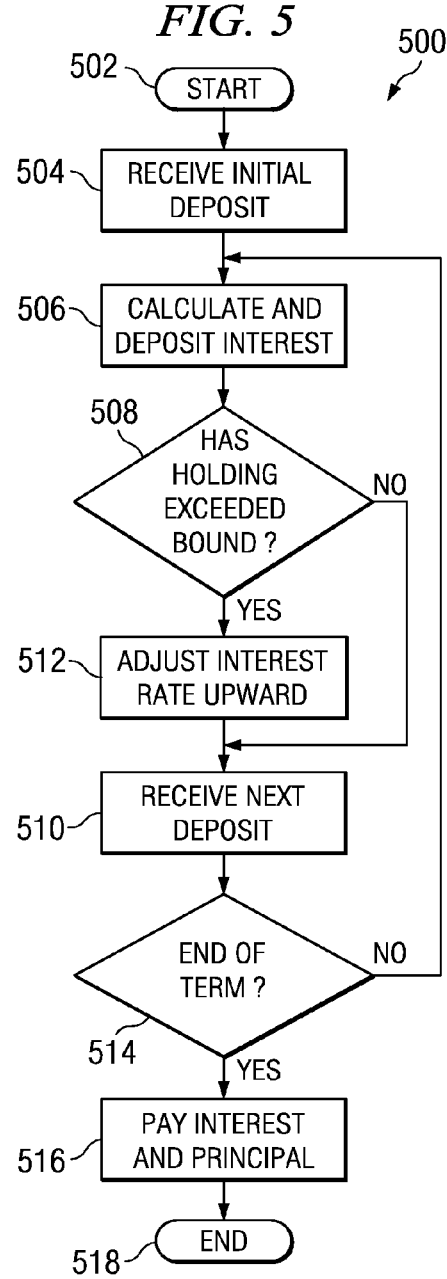

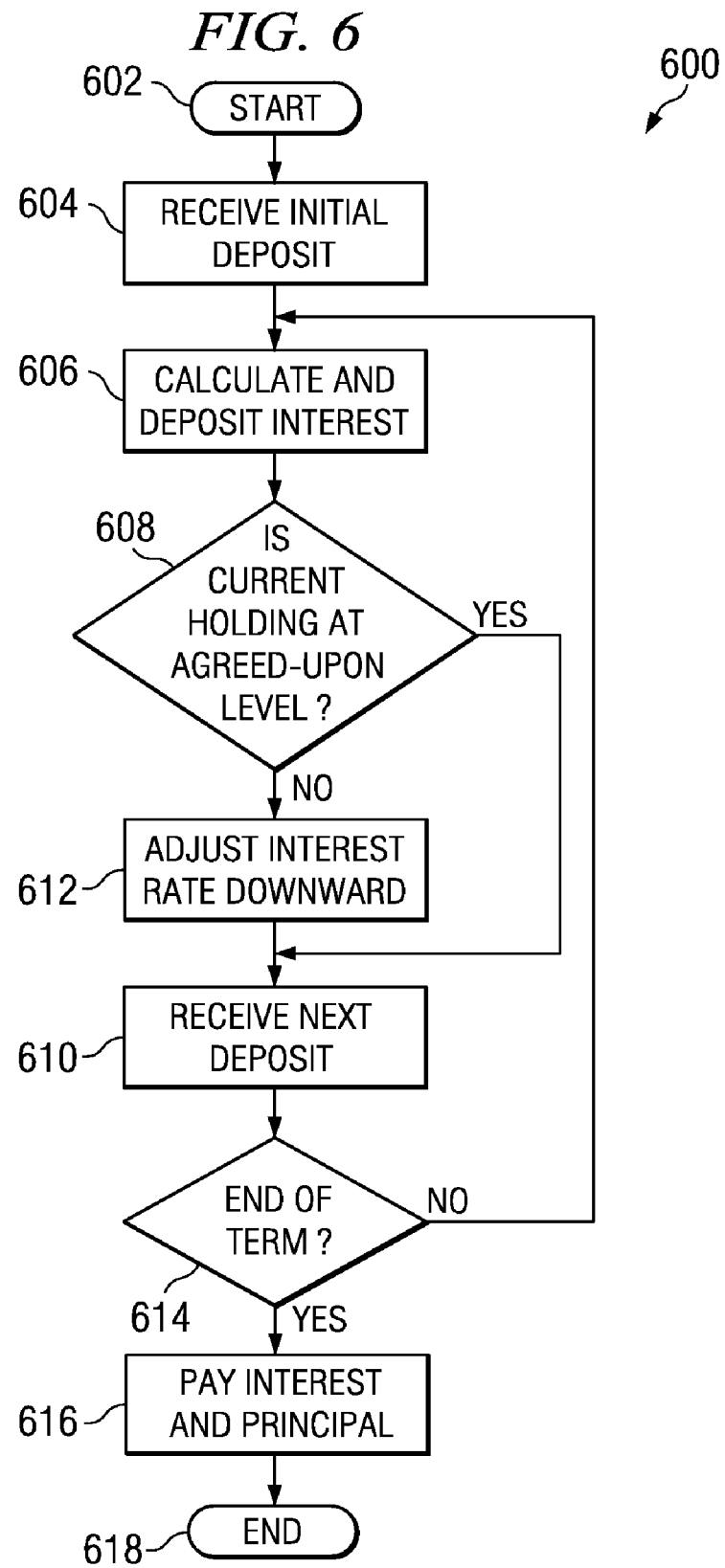

METHODS AND SYSTEMS FOR PROVIDING AN INVESTMENT INSTRUMENT WITH PERIODIC PRINCIPAL PAYMENTS

CROSS-REFERENCE TO RELATED APPLICATIONS

This application is related in subject matter to, and incorporates by reference herein in its entirety, each of the following:

a U.S. patent application Ser. No. 11/548,186 entitled Methods and Systems For Providing An Investment Instrument With Periodic Principal Payments, filed on the same date as this patent application; and a U.S. patent application Ser. No. 11/548,198 entitled Methods and Systems For Providing An Investment Instrument With Periodic Principal Payments, filed on the same date as this patent application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

Disclosed embodiments relate generally, by way of example and not limitation, to systems and methods that provide an investment instrument (e.g., a certificate of deposit) with periodic principal payments.

2. History of Related Art

A certificate of deposit (CD) is an investment instrument offered by financial institutions, such as banks and credit unions. With a CD, an initial sum of money, called the principal, is given by the customer to the financial institution, which holds the money for a specific, fixed term. In exchange for allowing the financial institution use of the principal for the fixed term, the financial institution pays the customer interest at a fixed annual rate for the duration of the term. Examples of fixed terms for a CD include three months, six months, one year and five years. CDs are typically held until maturity (i.e., at the end of the term), at which time the principal may be withdrawn together with the accrued interest. General rules of thumb for interest rates for CDs are as follows: 1) the larger the principal, the higher the interest rate; 2) the longer the term, the higher the interest rate; and 3) the smaller the financial institution, the higher the interest rate.

At most financial institutions, a CD holder can opt to receive the interest periodically as a paper check or via an electronic transfer into a checking or savings account. However, this option reduces total yield because there is no compounding of interest over the term of the CD. Some financial institutions allow the customer to select this option only at the time the CD is purchased.

Financial institutions often mail a notice to the CD holder requesting directions shortly before the CD matures. The notice usually offers the CD holder the choice of withdrawing the principal and accumulated interest or depositing the principal and accumulated interest into a new CD (i.e., "rolling the CD over"). Generally, a time window is allowed after maturity, during which the CD holder can cash in the CD without penalty. In the absence of directions to cash in the CD, it is common for financial institutions to roll over the CD automatically, tying up the principal and interest for an additional period of time. However, the CD holder can in some cases specify at the time the CD is opened that the CD is not to be automatically rolled over.

In many CDs, the deposited principal and accumulated interest can be withdrawn before maturity. However, withdrawals before maturity are usually subject to a substantial penalty. For example, a CD having a five-year term often has a penalty for early withdrawal of six months' interest. Such a penalty ensures that it is generally not in a CD holder's best interest to withdraw the accumulated principal and interest before maturity, unless the CD holder has another investment with a significantly higher expected return or has a serious need for the principal and interest minus the penalty.

CDs typically require a minimum deposit of at least $1,000. Many offer higher interest rates for larger deposits. For example, a one-year term CD offered by a particular financial institution may have an interest rate of 5.08% for a principal deposit of $1,000-$94,000, an interest rate of 5.23% for a principal deposit of $95,000-$174,999, and an interest rate of 5.33% for a principal deposit of $175,000 and greater. In exchange for keeping the deposited funds for the agreed-upon term, financial institutions usually grant higher interest rates than they do on accounts from which money may be withdrawn on demand, such as a savings account.

One advantage of CDs as compared to other investment instruments is that CDs generally provide for a higher interest rate than a savings account, while still being insured by the Federal Deposit Insurance Corporation (FDIC). In contrast, money market accounts are not FDIC insured. However, a disadvantage of CDs is that CDs require a higher initial investment than some customers are able to provide.

SUMMARY

This summary is not intended to represent each embodiment or every aspect; the following paragraphs of this summary provide representations of some embodiments as aspects thereof.

A method of providing an investment instrument with periodic principal payments. The method includes calculating an interest amount using a current holding amount and a current interest rate; adding the interest amount to the current holding amount to form a new holding amount; determining if the new holding amount is at least at an agreed-upon level; decreasing the current interest rate if it is determined that the new holding amount is not at least at the agreed-upon level; receiving a deposit from a customer; and adding the received deposit to the new holding amount to yield a new current holding amount. The customer is under a contractual agreement to make a series of periodic deposits over a term of the investment instrument.

A system for providing an investment instrument with periodic principal payments. The system includes a terminal adapted to receive a deposit from a customer, and a server in communication with the terminal The server is adapted to calculate an interest amount using a current holding amount and a current interest rate; add the interest amount to the current holding amount to form a new holding amount; determine if the new holding amount is at least at an agreed-upon level; decrease the current interest rate if it is determined that the new holding amount is not at least at the agreed-upon level; receive the deposit from a terminal; and add the received deposit to the new holding amount to yield a new current holding amount. The customer is under a contractual agreement to make a series of periodic deposits over a term of the investment instrument.

An article of manufacture for providing an investment instrument with periodic principal payments. The article of manufacture includes at least one computer readable medium, and processor instructions contained on the at least one computer readable medium, the processor instructions configured to be readable from the at least one computer readable medium by at least one processor and thereby cause the at least one processor to operate as to calculate an interest amount using a current holding amount and a current interest rate; add the interest amount to the current holding amount to form a new holding amount; determine if the new holding amount is at least at an agreed-upon level; decrease the current interest rate if it is determined that the new holding amount is not at least at the agreed-upon level; receive a deposit from a customer; and add the received deposit to the new holding amount to yield a new current holding amount. The customer is under a contractual agreement to make a series of periodic deposits over a term of the investment instrument.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 4 is a flow diagram illustrating another process for providing a certificate of deposit with periodic principal payments;

FIG. 5 is a flow diagram illustrating another process for providing a certificate of deposit with periodic principal payments; and FIG. 6 is flow diagram illustrating still another process for providing a certificate of deposit with periodic principal payments.

DETAILED DESCRIPTION

Methods and systems will now be described more fully with reference to the accompanying drawings, in which various embodiment(s) are shown. The methods and systems may, however, be embodied in many different forms and should not be construed as limited to the embodiments set forth herein; rather, these embodiments are provided so that this disclosure will be thorough and complete, and will fully convey the scope of the systems and methods to those skilled in the art.

In various embodiments, a customer of a financial institution agrees to purchase a certificate of deposit (CD) by making a series of periodic principal payments in exchange for receiving interest on that series of periodic principal payments calculated using an agreed-upon interest rate over an agreed-upon term. In some embodiments, the customer agrees to make a series of monthly deposits to the financial institution over the term of the CD. In return, the customer receives interest on the monthly payments compounded, for example, monthly at an agreed-upon annual percentage rate. A customer is thus allowed to receive the benefits of a CD without being required to make a relative large initial investment.

For example, a customer wishing to purchase a CD may agree to deposit $100 monthly for example, for one year, in exchange for an annual percentage rate of 5.08% compounded monthly. The customer, in turn, receives interest compounded monthly at one-twelfth of the agreed-upon annual percentage rate, which is approximately 0.004233 and is obtained by dividing 0.0508 by 12. In such an example, at the end of the first month, the customer earns approximately $0.42 in interest, such that a current holding of the customer at the end of the first month is $100.42.

Figure 1:
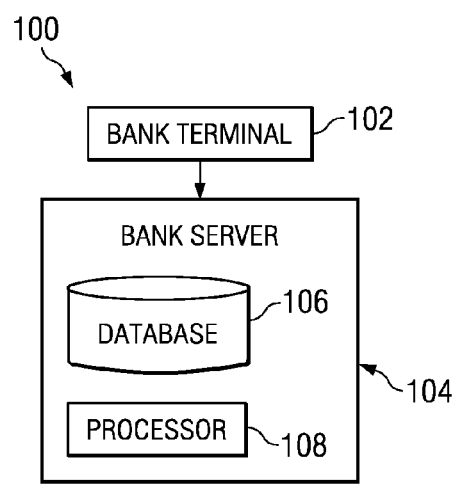
FIG. 1 is a system for providing a certificate of deposit with periodic principal payments.

FIG. 1 illustrates a system 100 for providing a CD with periodic principal payments. The system 100 includes a bank terminal 102 connected to a bank server 104 associated with a financial institution. The bank server 104 includes a database 106 for holding customer account information and a processor 108 for executing software instructions for carrying out various processes as described herein.

During a typical transaction, a customer of a financial institution enters into a contractual agreement to purchase a CD by making periodic payments for an agreed-upon term in exchange for receiving interest on that series of periodic principal payments calculated at an agreed-upon annual percentage rate over the term. The customer makes a deposit at the bank terminal 102 and information related to the deposit is transmitted to the bank server 104.

The processor 108 of the bank server 104, among performing other functions as described herein, calculates interest on the current account holding using the agreed-upon annual percentage rate, adds interest to the current account holding of the customer, and adds deposits to the current account holding of the customer. The account holding information for the customer is stored in the database 106. In some embodiments, the bank terminal 102 can be a terminal located at a bank. In other embodiments, the bank terminal 102 can be a network terminal accessible by the customer via a network connection, such as, for example, the Internet. Subsequent deposits by the customer can be made either at the bank terminal 102, via the Internet, or automatically deducted from a customer account by the bank server 104.

Figure 2:
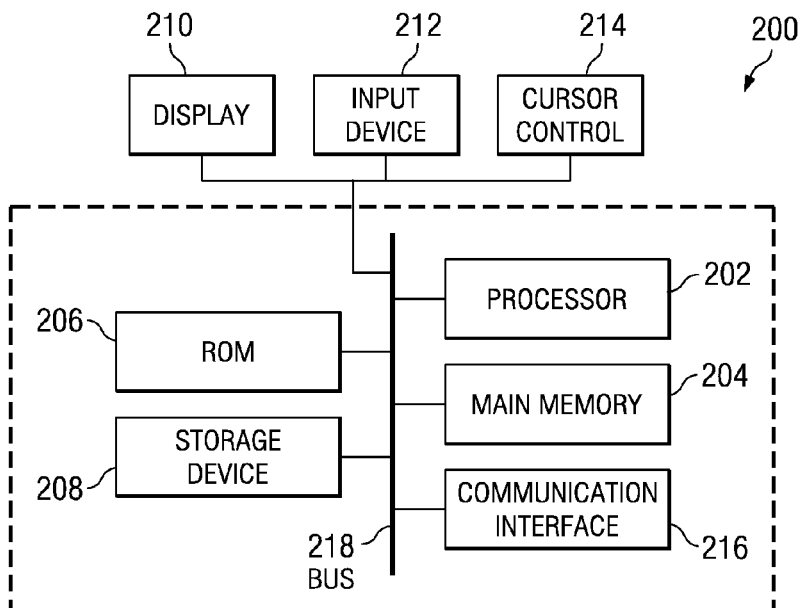
FIG. 2 is a bank server for providing a certificate of deposit with periodic principal payments.

Referring now to FIG. 2, an embodiment of a bank server 200 is illustrated in more detail. Those having skill in the art will appreciate that the bank server 200 may be used as the bank server 104 of FIG. 1. In the implementation shown, the bank server 200 may include a bus 218 or other communication mechanism for communicating information and a processor 202 coupled to the bus 218 for processing information. The bank server 200 also includes a main memory 204, such as a random access memory (RAM) or other dynamic storage device, coupled to the bus 218 for storing computer readable instructions to be executed by the processor 202.

The main memory 204 also may be used for storing temporary variables or other intermediate information during execution of the instructions to be executed by the processor 202. The bank server 200 further includes a read only memory (ROM) 206 or other static storage device coupled to the bus 218 for storing static information and instructions for the processor 202. A computer readable storage device 208, such as a magnetic disk or optical disk, is coupled to the bus 218 for storing information and instructions for the processor 202.

The bank server 200 may be coupled via the bus 218 to a display 210, such as a cathode ray tube (CRT), for displaying information to a user. An input device 212, including, for example, alphanumeric and other keys, is coupled to the bus 218 for communicating information and command selections to the processor 202. Another type of user input device is a cursor control 214, such as a mouse, a trackball, or cursor direction keys for communicating direction information and command selections to the processor 202 and for controlling cursor movement on the display 210. The cursor control 214 typically has two degrees of freedom in two axes, a first axis (e.g., x) and a second axis (e.g., y), that allow the device to specify positions in a plane.

The term "computer readable instructions" as used above refers to any instructions that may be performed by the processor 202 and/or other component of the bank server 200. Similarly, the term "computer readable medium" refers to any storage medium that may be used to store the computer readable instructions. Such a medium may take many forms, including, but not limited to, non volatile media, volatile media, and transmission media. Non volatile media include, for example, optical or magnetic disks, such as the storage device 208. Volatile media include dynamic memory, such as main memory 204. Transmission media include coaxial cables, copper wire and fiber optics, including wires of the bus 218. Transmission can take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer readable media may be involved in carrying one or more sequences of one or more instructions to the processor 202 for execution. For example, the instructions may initially be borne on a magnetic disk of a remote computer. The remote computer can load the instructions into its dynamic memory and send the instructions over a telephone line using a modem. A modem local to the bank server 200 can receive the data on the telephone line and use an infrared transmitter to convert the data to an infrared signal. An infrared detector coupled to the bus 218 can receive the data carried in the infrared signal and place the data on the bus 218. The bus 218 carries the data to the main memory 204, from which the processor 202 retrieves and executes the instructions. The instructions received by the main memory 204 may optionally be stored on the storage device 208 either before or after execution by the processor 202.

The bank server 200 may also include a communication interface 216 coupled to the bus 218. The communication interface 216 provides a two way data communication coupling between the bank server 200 and a terminal, such as the bank terminal 102 of FIG. 1. For example, the communication interface 216 may be an integrated services digital network (ISDN) card or a modem used to provide a data communication connection to a corresponding type of telephone line. As another example, the communication interface 216 may be a local area network (LAN) card used to provide a data communication connection to a compatible LAN. Wireless links may also be implemented. In any such implementation, the communication interface 216 sends and receives electrical, electromagnetic, optical, or other signals that carry digital data streams representing various types of information.

The storage device 208 can further include instructions for carrying out various processes for providing a certificate of deposit (CD) with periodic principal payments described herein when executed by the processor 202. The storage device 208 can further include a database for storing customer account information, such as the deposit history and current holding of a customer.

Figure 3:
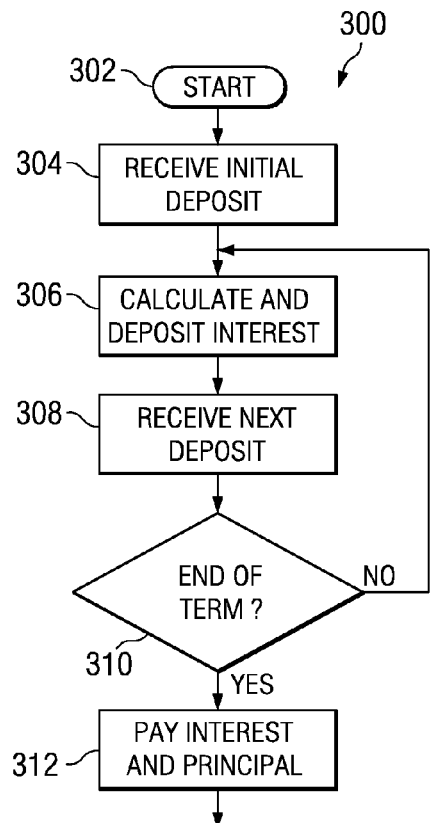
FIG. 3 is a flow diagram illustrating a process for providing a certificate of deposit with periodic principal payments.

FIG. 3 is a flow diagram illustrating an embodiment of a process for providing a certificate of deposit (CD) with periodic principal payments. In FIG. 3, a customer agrees to purchase a CD by making periodic principal payments in exchange for receiving interest using an agreed-upon annual percentage rate over an agreed-upon term. For example, the customer may agree to make monthly deposits to the financial institution over the term of the CD. In return, the customer receives interest compounded monthly at the agreed-upon annual percentage rate. Thus, the customer receives the benefits of a CD without being required to make a large initial investment. For example, a customer wishing to purchase a CD may agree to deposit $100 monthly for one year in exchange for receiving an annual percentage rate of 5.08%. The customer thus receives interest compounded monthly at one-twelfth of the agreed-upon annual percentage rate, which is approximately 0.004233 and is obtained by dividing 0.0508 by 12. In such an example, at the end of the first month, the customer earns $0.42 in interest such that the current holding for the customer is $100.42. At the end of the second month, the current holding for the customer is $201.27. At the end of the one-year term, the current holding for the customer is $1,233.54.

Still referring to FIG. 3, a process 300 begins at step 302, in which step a customer enters into an agreement with a financial institution to purchase a CD having periodic principal payments. In step 304, the financial institution receives an initial deposit of an agreed-upon amount. In step 306, after an agreed-upon period has passed, for example one month, interest is calculated on the initial deposit and deposited into the customer's CD account along with the initial deposit as a current holding amount. In step 308, the financial institution receives the next deposit from the customer at the agreed-upon period, for example, after one month has passed since step 304. In various embodiments, the next deposit (i.e., the deposit of step 308) from the customer can be performed automatically without requiring action from the customer by transferring the amount from another account of the customer, such as a checking account. At step 310, a determination is made regarding whether the term of the CD has ended. If it is determined at step 310 that the term has not ended, the process 300 returns to step 306, at which time interest is again calculated based upon the current holding, which includes past deposits and the accumulated interest. If at step 310 it is determined that the term of the CD has ended, the process continues to step 312. At step 312, the current holding is paid to the customer and the process 300 ends at step 314. In various embodiments, the financial institution can mail a check to the customer in the amount of the payout (i.e., the current holding at the end of the term) or electronically deposit the payout amount in an electronic account such as a savings or checking account. In accordance with still other embodiments, the customer can choose to have either the total deposit amount and accumulated interest, or just the total deposit amount, rolled over into a new CD instead of receiving a payment for the total deposit amount and interest.

FIG. 4 is a flow diagram illustrating another embodiment of a process for providing a CD with periodic principal payments. In FIG. 4, a customer agrees to purchase a CD by periodically making principal payments in exchange for receiving interest using an agreed-upon annual percentage rate over an agreed-upon term. In FIG. 4, the customer is provided with an option of withdrawing accumulated interest during the term of the CD.

Still referring to FIG. 4, a process 400 begins at step 402, in which a customer enters into an agreement with a financial institution to purchase a CD having periodic principal payments. In step 404, the financial institution receives an initial deposit of an agreed-upon amount. In step 406, after an agreed-upon period has passed, for example one month, interest is calculated on the initial deposit and deposited into the customer's CD account. In addition, in step 408, the customer is provided with an option to withdraw all or a portion of the accumulated interest. If the customer decides to withdraw the accumulated interest, the process 400 continues to step 410, at which step the accumulated interest is paid to the customer and deducted from the total current holding of the customer's CD account.

In step 412, the financial institution receives the next deposit from the customer at the agreed-upon period, for example, after one month has passed since the initial deposit of step 404. In various embodiments, the next deposit from the customer can be performed automatically without requiring action from the customer by transferring the amount from another account of the customer, such as a checking account. At step 414, a determination is made regarding whether the term of the CD has ended. If it is determined at step 414 that the term has not ended, the process 400 returns to step 406, at which time interest is again calculated based upon the current holding, which includes past deposits and accumulated interest. If at step 414 it is determined that the term of the CD has ended, the process continues to step 416. At step 416, the current holding, which includes the past deposits and accumulated interest minus any interest payments withdrawn by the customer, is paid to the customer and the process 400 ends at step 418. In various embodiments, the financial institution can mail a check to the customer in the amount of the payout, or electronically deposit the payout amount in an electronic account such as a savings or checking account. In still other embodiments, the customer can choose to have either the total deposit amount and accumulated interest, or just the total deposit amount rolled over into a new CD instead of receiving a payment for the total deposit amount and interest.

Referring now to FIG. 5, a flow diagram illustrating a process for providing a CD with periodic principal payments is shown. In accordance with the embodiment of FIG. 5, a customer enters into an agreement to purchase a CD by periodically making principal payments in exchange for receiving interest using an agreed-upon annual percentage rate over an agreed-upon term. In FIG. 5, an option is provided for increasing the annual percentage rate of the CD if the account holding of the customer has exceeded a preset bound due to, for example, the customer making one or more periodic deposit payments in an amount greater than the amount agreed-upon. For example, if the deposit payments to date have resulted in the current customer account holding to be significantly greater than the agreed-upon total principal, the financial institution can choose to increase the annual interest rate that will be used to determine the interest paid on the current holding over the remaining term of the CD.

Still referring to FIG. 5, a process 500 begins at step 502 in which a customer agrees to purchase a certificate of deposit (CD) having periodic principal payments from a financial institution. In step 504, the financial institution receives an initial deposit of an agreed-upon amount. In step 506, after an agreed-upon period has passed, for example one month, interest is calculated on the initial deposit at the agreed-upon percentage rate and deposited into the customer's CD account. In addition, in step 508, a determination is made regarding whether the account holding of the customer, including the total of all deposits made to date and interest generated therefrom, has exceeded a preset bound. If it is determined in step 508 that the account holding has exceeded the preset bound, the annual interest rate of the CD is adjusted upwardly by a predetermined amount at step 512.

For example, if the agreement for a CD having a total principal of $1000 and a term of one-year has an agreed-upon annual percentage rate of 5.08%, the financial institution can choose to increase the annual percentage rate to 5.18% if the account holding of the customer has reached $2000. In some embodiments, the financial institution can choose to raise the interest a predetermined maximal number of times, for example once, during the term of the CD. From step 512, the process 500 proceeds to step 510, at which step the financial institution receives the next deposit from the customer at the agreed-upon period, for example, after one month has passed. In various embodiments, the deposit of step 510 from the customer can be performed automatically without requiring action from the customer by transferring the amount from another account of the customer, such as a checking account. If it is determined in step 508 that the account holding has not exceeded the preset bound, the process 500 continues to step 510.

In various embodiments, a lookup table containing a number of variable interest rates cross-referenced to current holding amounts can be used to determine an interest rate increase when an account holding has exceeded a predetermined bound. In still other embodiments, a formula for determining a new interest rate based upon a previous interest rate can be used, such as increasing the interest rate by a predetermined percentage.

From step 510, the process 500 continues to step 514. At step 514, a determination is made regarding whether the term of the CD has ended. If it is determined at step 514 that the term has not ended, the process 500 returns to step 506, at which time interest is again calculated based upon the current holding, including the total deposit amounts and the accumulated interest, and any adjustment of the interest rate that may have occurred at step 512. If at step 514 it is determined that the term of the CD has ended, the process 500 continues to step 516. At step 516, the current holding (i.e., the total deposit amount and accumulated interest) is paid to the customer and the process 500 ends at step 518. In various embodiments, the financial institution can mail a check to the customer in the amount of the payout or electronically deposit the payout amount in an electronic account such as a savings or checking account. In still other embodiments, the customer can choose to have either the total deposit amount and accumulated interest, or just the total deposit amount, rolled over into a new CD instead of receiving a payment for the total principal and interest.

FIG. 6 is a flow diagram illustrating another process for providing a CD with periodic principal payments. In FIG. 6, a customer purchases a CD by agreeing to make periodic principal payments in exchange for receiving interest using an agreed-upon annual percentage rate over an agreed-upon term. In FIG. 6, an option is provided for decreasing the annual percentage rate of the CD if the current account holding of the customer is not at least at an agreed-upon level, for example, if the customer has not made one or more of the agreed-upon periodic deposits in the agreed-upon amount. For example, if the deposit payments to date have resulted in the current customer account holding to be less than an agreed-upon level, the financial institution can choose to decrease the annual interest rate that will be used to determine the interest paid on the current account holding over the remaining term of the CD.

Still referring to FIG. 6, a process 600 begins at step 602 in which a customer agrees to purchase a certificate of deposit (CD) having periodic principal payments from a financial institution. In step 604, the financial institution receives an initial deposit of an agreed-upon amount. In step 606, after an agreed-upon period has passed, for example one month, interest is calculated on the initial deposit at the agreed-upon percentage rate and deposited into the customer's CD account. In addition, in step 608, a determination is made regarding whether the current account holding of the customer, including the total of all deposits made to date and interest generated therefrom, is at least at an agreed upon level. If it is determined in step 608 that the account holding is not at least at the agreed-upon level, the annual interest rate of the CD is adjusted downwardly by a predetermined amount at step 612. For example, if the agreement for a CD has an agreed-upon annual percentage rate of 5.08% and an agreed-upon monthly payment of $100, the financial institution can choose to decrease the annual percentage rate to 4.6% if the customer's last monthly payment was $50, resulting in the current account holding of the customer being less than an agreed-upon level.

From step 612, the process 600 proceeds to step 610, at which step the financial institution receives the next deposit from the customer at the agreed-upon period, for example, after one month has passed. In various embodiments, the deposit of step 610 from the customer can be performed automatically without requiring action from the customer by transferring the amount from another account of the customer, such as a checking account. If it is determined in step 608 that the current account holding is at least at the agreed-upon level, the process 600 continues to step 610.

In various embodiments, a lookup table containing a number of variable interest rates cross-referenced to current holding amounts can be used to determine an interest rate decrease when a current account holding is not at an agreed-upon level. In still other embodiments, a formula for determining a new interest rate based upon a previous interest rate can be used, such as decreasing the interest rate by a predetermined percentage.

From step 610, the process 600 continues to step 614. At step 614, a determination is made regarding whether the term of the CD has ended. If it is determined at step 614 that the term has not ended, the process 600 returns to step 606, at which time interest is again calculated based upon the current holding, including the total deposit amounts and the accumulated interest, and any adjustment of the interest rate that may have occurred at step 612. If at step 614 it is determined that the term of the CD has ended, the process 600 continues to step 616. At step 616, the current holding (i.e., the total deposit amount and accumulated interest) is paid to the customer and the process 600 ends at step 618. In various embodiments, the financial institution can mail a check to the customer in the amount of the payout or electronically deposit the payout amount in an electronic account such as a savings or checking account. In still other embodiments, the customer can choose to have either the total deposit amount and accumulated interest, or just the total deposit amount, rolled over into a new CD instead of receiving a payment for the total principal and interest.

Although the above-described embodiments have been directed to methods and systems for providing a CD with periodic principal payments, it should be understood that the principles described herein could also be applied to other types of financial investment instruments for which periodic principal payments would be desirable. In addition, the use of annual percentage rate for the calculation of a rate of return on investment was used as an example and is not intended to be limiting. It should be understood that other principles for determining an interest rate or return on an investment could also be applied without departing from the principles of the methods and systems set forth herein.

The previous description is of embodiment(s) for implementing the methods and systems described herein, and the scope should not be limited by this description. The scope is instead defined by the following claims.

What is claimed is:

1. A method of a server providing an investment instrument with periodic principal payments, the method comprising the server having a processor performing the steps of:
   (a) electrically calculating an interest amount using a current holding amount and a current interest rate;
   (b) electrically adding the interest amount to the current holding amount to form a new holding amount;
   (c) electrically determining if the new holding amount is at least at an agreed-upon level;
   (d) electrically decreasing the current interest rate if it is determined that the new holding amount is not at least at the agreed-upon level;
   (e) electrically receiving a deposit from a customer; and
   (f) electrically adding the received deposit to the new holding amount to yield a new current holding amount; and
   (g) wherein the customer is under a contractual agreement to make a series of periodic deposits over a term of the investment instrument.

2. The method of claim 1, wherein the investment instrument is a certificate of deposit.

3. The method of claim 1 further comprising determining if a term of the investment instrument has ended.

4. The method of claim 3, comprising repeating steps (a)-(e) if it is determined that the term of the investment instrument has not ended.

5. The method of claim 1, further comprising increasing the interest rate if the new holding amount exceeds a predetermined bound.

6. The method of claim 1, further comprising withdrawing accumulated interest by the customer during the term of the investment instrument.

7. The method of claim 1, wherein after an initial deposit, the series of periodic deposits is made automatically.

8. A system for providing an investment instrument with periodic principal payments, the system comprising:
   a terminal receiving a deposit from a customer; and
   a server in communication with the terminal, the server:
      (a) calculating an interest amount using a current holding amount and a current interest rate;
      (b) adding the interest amount to the current holding amount to form a new holding amount;
      (c) determining if the new holding amount is at least at an agreed-upon level;
      (d) decreasing the current interest rate if it is determined that the new holding amount is not at least at the agreed-upon level;
      (e) receiving the deposit from a terminal; and
      (f) adding the received deposit to the new holding amount to yield a new current holding amount;
      wherein the customer is under a contractual agreement to make a series of periodic deposits over a term of the investment instrument.

9. The system of claim 8, wherein the investment instrument is a certificate of deposit.

10. The system of claim 8, wherein the server is further adapted to determine if the term of the investment instrument has ended.

11. The system of claim 10, wherein if it is determined that the term of the investment instrument has not ended the server is further adapted to repeat steps (a)-(e).

12. The system of claim 8, wherein the server is further adapted to increase the interest rate if the new holding amount exceeds a predetermined bound.

13. The system of claim 8, wherein the server is further adapted to:
   withdraw accumulated interest during the term of the investment instrument; and
   pay the accumulated interest to the customer.

14. The system of claim 8, wherein after an initial deposit, the series of periodic deposits is made automatically.

15. An article of manufacture for providing an investment instrument with periodic principal payments, the article of manufacture comprising:
   at least one computer readable medium; and
   processor instructions contained on the at least one computer readable medium, the processor instructions configured to be readable from the at least one computer readable medium by at least one processor and thereby cause the at least one processor to operate as to:
   (a) calculate an interest amount using a current holding amount and a current interest rate;
   (b) add the interest amount to the current holding amount to form a new holding amount;
   (c) determine if the new holding amount is at least at an agreed-upon level;
   (d) decrease the current interest rate if it is determined that the new holding amount is not at least at the agreed-upon level;
   (e) receive a deposit from a customer;
   (f) add the received deposit to the new holding amount to yield a new current holding amount; and
   wherein the customer is under a contractual agreement to make a series of periodic deposits over a term of the investment instrument.

16. The article of manufacture of claim 15, wherein the investment instrument is a certificate of deposit.

17. The article of manufacture of claim 15, wherein the processor instructions are further configured to cause the at least one processor to operate as to determine if the term of the investment instrument has ended.

18. The article of manufacture of claim 17, wherein if it is determined that the term of the investment instrument has not ended the processor instructions are further configured to cause the at least one processor to operate so as to repeat steps (a)-(e).

19. The article of manufacture of claim 15, the processor instructions are further configured to cause the at least one processor to operate so as to increase the interest rate if the new holding amount exceeds a predetermined bound.

20. The article of manufacture of claim 15, wherein the processor instructions are further configured to cause the at least one processor to operate so as to:
   withdraw accumulated interest during the term of the investment instrument; and
   pay the accumulated interest to the customer.

21. The article of manufacture of claim 15, wherein after an initial deposit, the series of periodic deposits is made automatically.

* * * * *